(12) United States Patent
Malaviarachchi et al.

(10) Patent No.: US 8,059,820 B2
(45) Date of Patent: Nov. 15, 2011

(54) MULTI-FACTOR CONTENT PROTECTION

(75) Inventors: Rushmi U. Malaviarachchi, Redmond, WA (US); Mayur Kamat, Bellevue, WA (US); David B. Cross, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/870,964

(22) Filed: Oct. 11, 2007

(65) Prior Publication Data
US 2009/0097660 A1 Apr. 16, 2009

(51) Int. Cl.
*H04L 9/00* (2006.01)
*G06F 21/00* (2006.01)

(52) U.S. Cl. ............... 380/279; 705/71; 726/1

(58) Field of Classification Search .......... 380/259–266, 380/277–279; 705/71; 726/1–36; 713/171
See application file for complete search history.

(56) References Cited

U.S. PATENT DOCUMENTS

| | | | |
|---|---|---|---|
| 6,098,056 A * | 8/2000 | Rusnak et al. ................. | 705/75 |
| 2003/0023862 A1 | 1/2003 | Yamasaki | |
| 2004/0003268 A1 | 1/2004 | Bourne | |
| 2004/0187018 A1 | 9/2004 | Owen et al. | |
| 2005/0149759 A1 | 7/2005 | Vishwanath et al. | |
| 2005/0228993 A1 | 10/2005 | Silvester et al. | |
| 2005/0278775 A1 | 12/2005 | Ross | |
| 2006/0178997 A1* | 8/2006 | Schneck et al. ................. | 705/50 |
| 2006/0184787 A1 | 8/2006 | Sandhu et al. | |
| 2006/0235795 A1 | 10/2006 | Johnson et al. | |
| 2006/0253894 A1 | 11/2006 | Bookman et al. | |
| 2007/0011452 A1 | 1/2007 | Marquet et al. | |
| 2007/0022196 A1 | 1/2007 | Agrawal | |
| 2007/0186106 A1 | 8/2007 | Ting et al. | |

FOREIGN PATENT DOCUMENTS

| | | |
|---|---|---|
| KR | 10-2004-0096493 | 11/2004 |
| WO | 2004-109482 | 12/2004 |

OTHER PUBLICATIONS

Lexdon Business Library, "Digital Insight and TriCipher Partner to Enhance Online Banking Security With Multifactor Authentication", 2 pages, http://www.lexdon.com/article/Digital_Insight_and_TriCipher_Partner/3609.html.

(Continued)

*Primary Examiner* — Nasser Moazzami
*Assistant Examiner* — Lisa Lewis
(74) *Attorney, Agent, or Firm* — Workman Nydegger

(57) ABSTRACT

Protecting content. A recipient receives content from a publisher. Some content is managed by an access server. The access server controls the recipient's use of managed content through interaction with a trusted agent at the recipient. The content is encrypted to a content key, and the content is associated with policy information. The policy information includes the content key for decrypting the content. The policy information is encrypted to an access server key allowing the policy information to be decrypted by the access server. The content key is received from the access server. The content key is encrypted to a trusted agent key. The content key is further encrypted to additional factor(s) defining additional content protection beyond that provided by trusted agent. The content key is decrypted using the trusted agent key and the at least one additional factor. The content is decrypted using the content key.

23 Claims, 3 Drawing Sheets

OTHER PUBLICATIONS

Sourcewire, "RSA San Francisco—Avoco Secure Introduces Solutions that Combine High-Assurance Digital Credentials from IdenTrust and Avoco's secure2 Product Line and announce a New Release of secure2trust, Which Supports Microsoft Office Outlook", 5 pages, 2006, http://www.sourcewire.com/releases/rel_display.php?relid=29494&hilite=.

Unlu, Vural, et al., "The access-usage-control-matrix: A heuristic tool for implementing a selected level of technical content protection", Proceedings of the Seventh IEEE International Conference on E-Commerce Technology (CEC'05) 2005 IEEE, http://ieeexplore.ieee.org/Xplore/login.jsp?url=/iel5/10218/32584/01524099.pdf?arnumber=1524099.

Infosecurity A Fanatic Media Publication, "Authentication Multi-Factor Authentication—Part 5 Securing Information With Multi-Layered Security", Jul. 2007, 2 pages, http://fanaticmedia.com/infosecurity/archive/july07/Authentication%20—%20Part%205.pdf.

\* cited by examiner

MULTI-FACTOR CONTENT PROTECTION

BACKGROUND

Background and Relevant Art

Computers and computing systems have affected nearly every aspect of modern living. Computers are generally involved in work, recreation, healthcare, transportation, entertainment, household management, etc.

Users often have a need to protect data. This protection can be accomplished by various encryption techniques and using various credential based access controls. For example, access to sensitive data may be gated or protected through the use of passwords or smart cards as either authentication validation or encryption keys. If a user can provide an appropriate password or smart card, then the user may be granted access to the data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method practiced in a computing environment. The method includes acts for protecting content. The method includes, at a recipient, receiving content from a publisher. At least some access to content used by the recipient is managed by an access server. The access server is configured to control the recipient's use of managed content through interaction with a trusted agent tied to the recipient computer system. The content is encrypted to a content key, and the content is associated with policy information. The policy information includes the content key for decrypting the content. The policy information is encrypted to an access server key so that the policy information can be decrypted by the access server. At the recipient, the content key is received from the access server. The content key is encrypted to a trusted agent key such that the trusted agent can decrypt the content key. The content key is further encrypted to at least one additional factor defining additional content protection beyond content protection provided by a trusted agent. At the recipient, the content key is decrypted using the trusted agent key and the at least one additional factor. The content is then decrypted using the content key.

In another embodiment, a system is implemented. The system includes a recipient computer system. The recipient computer system is configured to receive content from a publishing computer system, either directly or indirectly. The recipient computer system includes a trusted agent. The trusted agent includes software or hardware which communicates with an access server to receive authorization to access the content along with usage restrictions for the content. The trusted agent includes a trusted agent key for decrypting data from the access server. The recipient computer system further includes a trusted application configured to communicate with the trusted agent to access content controlled by the access server. The recipient computer system further includes a factor key configured to decrypt data from the trusted agent and a user key guarded by the trusted agent configured to decrypt data from the access server. The data from the access server includes a content key for decrypting content from the publishing computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
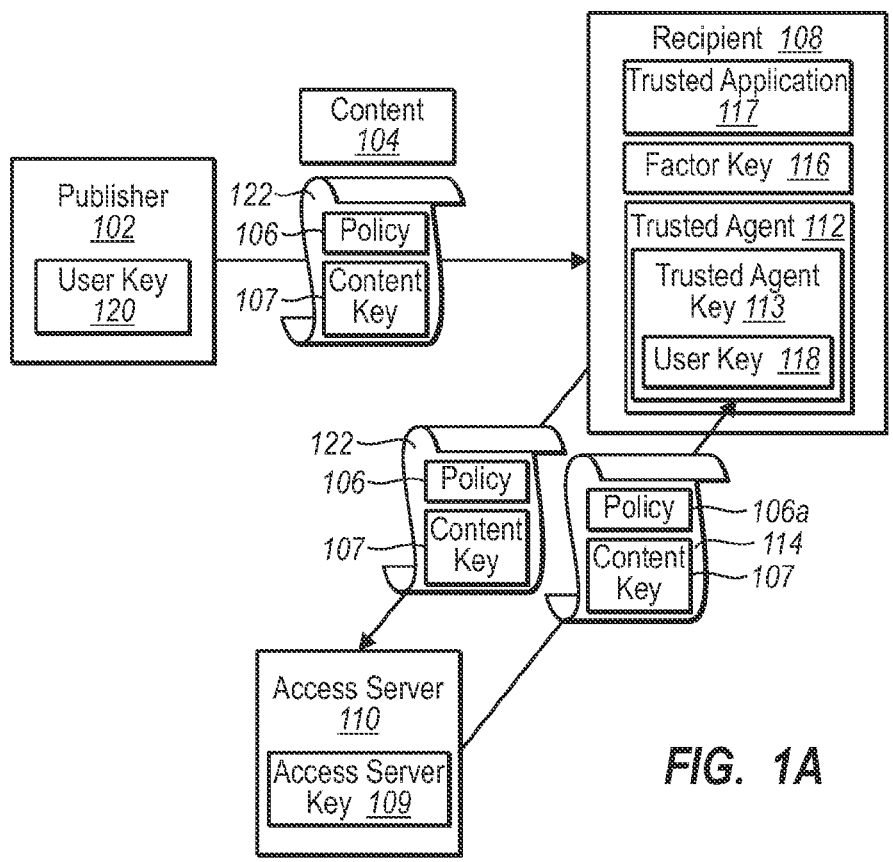
FIG. 1A illustrates a system where content may be protected.

Some embodiments herein may comprise a special purpose or general-purpose computer including various computer hardware, as discussed in greater detail below.

Digital content may be protected by encrypting the content to protection factors. Protection factors are tied to cryptographic devices or keys. Several different classes of factors exist using different credentials, such as for example something known, e.g. a password or personal identification number (PIN), something possessed, e.g. hardware security tokens such as a smart card, or some characteristic of a user, e.g. biometric characteristics. This type of protection generally allows any user who can present the appropriate credential to access protected content. Notably, some factors may span more than one class. For example, smartcards may require something possessed, i.e. the smartcard itself, and something known, i.e. a PIN.

An additional type of content protection relates to restricted use content. In restricted use content environments, a central organization controls how content is used and accessed. Controls may be based on the identity of a user trying to use or access the content, based on the action being attempted on the content, based on the time of day, based on locality, or other conditions. Illustratively, the central organization may allow some users full access to content including editing and the ability to send the content outside of the organization. Other users may be restricted to read only access. In another example, particularly sensitive content may be restricted from being sent outside of the organization irrespective of the user identity.

Ensuring that usage restrictions are followed may be accomplished by using a trusted agent at a user machine which communicates with a centralized access server that makes authorization and usage restriction decisions for the particular user's ability to access particular content. Applications that use the content are trusted applications that are able to interact with the trusted agent. Trusted applications are those that are trusted to enforce usage restrictions.

Some embodiments described herein allow a publisher to publish content to a user, where the content is protected by both encryption to a cryptographic factor such as those as illustrated above, as well as allowing the content to be managed by a content usage control infrastructure. In some embodiments, the level of access rights may be determined by the use of one or more factors. Additionally, some embodiments allow for the factor based encryption to be accomplished irrespective of whether or not the publisher is aware of the generic type of factor being used, or the specific factor being used. Further, some embodiments allow a publisher to specify in policy additional factors that should be used to protect content. The specification can occur by specifying a generic factor, by specifying the exact factor that should be used, or may be implicit depending on the type of content to be protected.

Figure 1B:
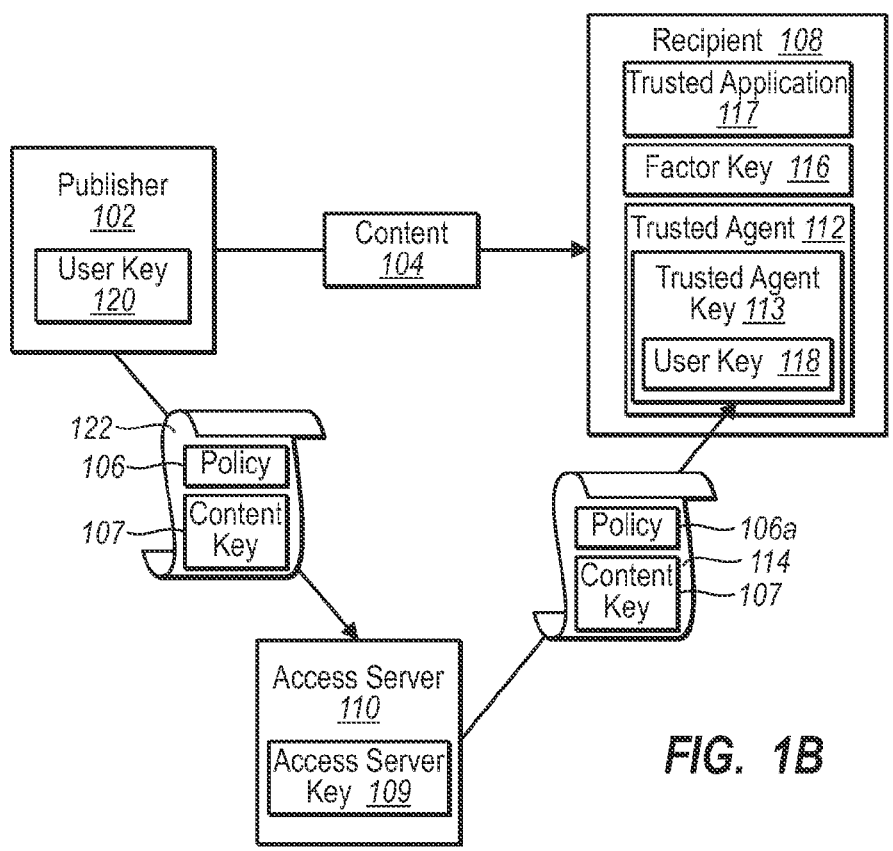
FIG. 1B illustrates an alternate system in which content may be protected.
Figure 1C:
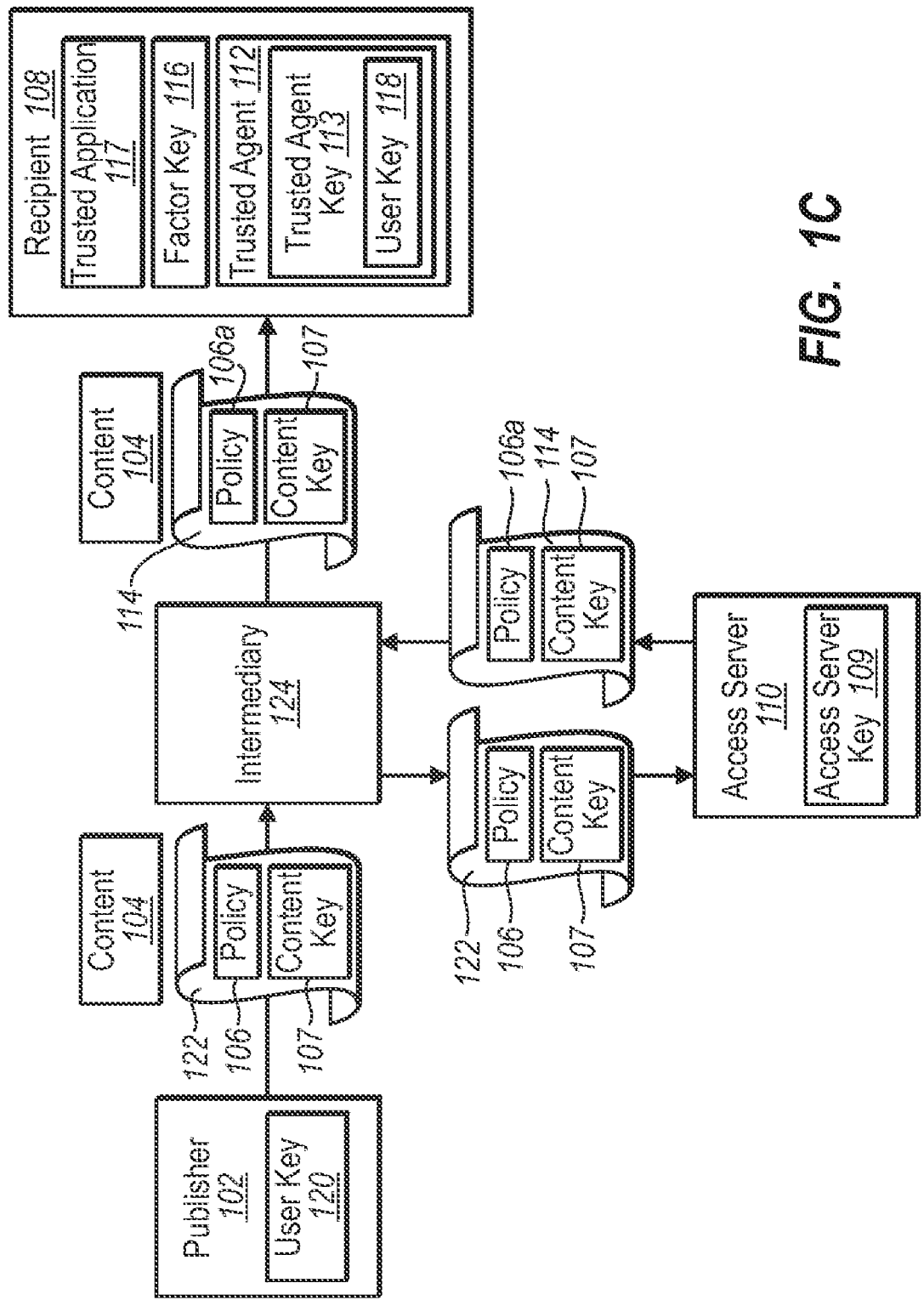
FIG. 1C illustrates yet another alternate system in which content may be protected.

Examples are illustrated in FIGS. 1A-1C. For example, FIG. 1A illustrates a publisher 102. The publisher 102 publishes content 104, policy 106 and a content key 107 to a recipient 108. The content 104 is encrypted using the content key 107. As will be discussed in more detail below, the policy 106 may include information such as usage restrictions and in some embodiments, specification of additional encryption factors. The policy 106 and content key 107 may be encrypted to an access server key 109 such that the policy 106 and content key 107 may be decrypted by an access server 110 used for controlling content usage. Notably, encryption to a key does not necessarily include using the key to perform the encryption. For example, encryption using asymmetric keys is performed by encrypting to a public key at the encrypting entity and decrypting using a private key at the decrypting entity.

Returning now to the present example, the recipient 108 sends the policy 106 and the content key 107 to the access server 110. Notably, while the policy 106 and content key 107 are shown as being sent together in the same token, they may also be sent separately or in any other appropriate fashion. This is true of any of the examples illustrated where items are being shown as being sent together. The access server 110 can then decrypt the policy 106 and the content key 107. The access server 110 sends a version of the policy 106a and the content key 107 to a trusted agent 112 of the recipient 108. The policy 106a may be the subset of total policy 106 that applies to the recipient that is requesting access to the content. In one embodiment, the policy 106a and the content key 107 are sent in an authorization token 114. The policy 106a and content key 107 may be encrypted before it is sent to the trusted agent 112. For example, the policy 106a and content key 107 sent to the trusted agent 112 may be encrypted to the trusted agent key 113 by the access server such that the trusted agent 112 can decrypt the policy 106a and the content key 107. The policy 106a may be further encrypted by the access server 110 using an additional factor such that the policy 106a and content key 107 may be decrypted using a factor key 116 at the recipient 108. In one embodiment, the factor may be a factor specified in the policy 106 sent from the publisher 102 to the recipient 108.

A number of keys have been introduced above, and will now be described in more detail. In one embodiment, content protection includes a provisioning or bootstrapping phase. During the bootstrapping phase, the trusted agent key 113 is created. The trusted agent key 113 may be a unique, random cryptographic key for the trusted agent 112 on a given machine. As described previously, the trusted agent 112 is a software or hardware component that an organization trusts to enforce policies on its behalf. The trusted agent key 113 is protected by the trusted agent 112 and is therefore bound to a given machine, such as the machine of the recipient 108. The trusted agent key 113 is only used by the trusted agent 112 and is not released outside the trusted agent 112. Trusted applications, such as trusted application 117, can call the trusted agent 112 when the trusted agent key is needed.

Organization-managed user keys for users can also be created. For example, a user key 118 may created be for the recipient 108. Organization-managed user keys are owned by the organization but issued to users such as the recipient 108. The recipient 108 is granted the ability to use the user key 118 only as specified by organizational policies that apply to either the consumption or creation of protected content. Notably, the publisher 102 may also be bootstrapped to obtain appropriate organization managed user keys, such as user key 120 illustrated in FIG. 1.

Once the relevant participants in a content protection system are bootstrapped, a publisher 102 creates content 104 and protects it with policy 106 that can be either defined by the publisher 102 or the publisher's organization. A publishing license 122, illustrated in FIG. 1A, is created containing the information protection policy for the information and the content key, both encrypted to the access server key 109. The content 104 is then made available to the recipient 108 through any appropriate mechanism. In one embodiment, when the information protection policy in the policy 106 is applied to the protected content 104, the policy 106 may require a specific protection factor (such as a smartcard) be used when accessing the content 104. This factor could be required for accessing the entire content 104, or it could be required for accessing specific sections of the content 104, depending on the policy. Further embodiments directed to differential access rights depending on what factors are used will be discussed in more detail below.

To access the protected content 104, the recipient 108 needs an authorization token 114 from the access server 110 describing the policy 106a for that specific recipient's access to that specific content 104, and containing the content key 107, which may be encrypted to the recipient's organization-managed user key 118. This token 114, including policy 106a and the content key 107 illustrated in FIG. 1, may be retrieved from the access server 110 by the recipient 108 or it may already have been retrieved on the recipient's behalf as is illustrated in FIGS. 1B and 1C discussed in more detail below. When additional protection factors are required by the policy 106a or otherwise, the content key 107 is encrypted to both the recipient's organization-managed user key 118 and the keys belonging to the necessary additional factors. For example, in one embodiment the content key 107 in the authorization token 114 may be encrypted to a smartcard key, represented by factor key 116.

With the authorization token 114 and the keys acquired during bootstrapping, the recipient 108 now has the key material needed to access the protected content 104. The trusted agent 112 uses its trusted agent key to decrypt the recipient's organization-managed user key 118, which is then used to decrypt the content key 107 from the authorization token 114. The recipient may also need to use a security token or tokens, such as factor key 116, that provide the additional factors, which have already been provisioned, such as through an out-of-band process, to decrypt the content key 107.

The trusted agent 112 then uses this content key to decrypt the content 104 and pass the decrypted content to a trusted application 117, under the contract that the application will enforce any usage policies (such as "do not print") that have been specified for that content 104. For the content 104 to be decrypted, the trusted agent 112 is involved along with the additional protection factors.

While FIG. 1A illustrated an example where the policy 106 and content key 107 were passed directly from the recipient 108 to the access server, other embodiments may be implemented. For example, FIG. 1B illustrates an example where the publisher 102 sends the content 104 to the recipient, while the policy 106 and content key 107 are sent directly to the access server 110. The access server can then provide the authorization token 114 including the policy 106a and the content key 107 to the trusted agent 112 of the recipient 108. The trusted agent 112 and recipient can then decrypt the content key 107 and the content 104 using the content key 107 and the other specified factors as described previously.

FIG. 1C illustrates yet another alternative embodiment, where an intermediary may facilitate provisioning of the policy 106 and content key 107. In the example illustrated in FIG. 1C, the publisher 102 provides the content 104, the policy 106 and the content key 107 to an intermediary 124. For example, the content 104 in the illustration may be an email message and the intermediary 124 may be a mail server. The intermediary passes the content 104 on to the recipient 108 and sends the policy 106 and the content key 107 to the access server 110. In the embodiment illustrated, the access server 110 may provide the access token 114 to the intermediary 124, which would then provide the access token to the recipient 108 through the trusted agent 112. Decryption can then be accomplished as described above. In an alternative embodiment, the access server 110 then sends the access token 114 to the recipient 108 through the trusted agent 112 including the policy 106a and the content key 107.

Figure 2:
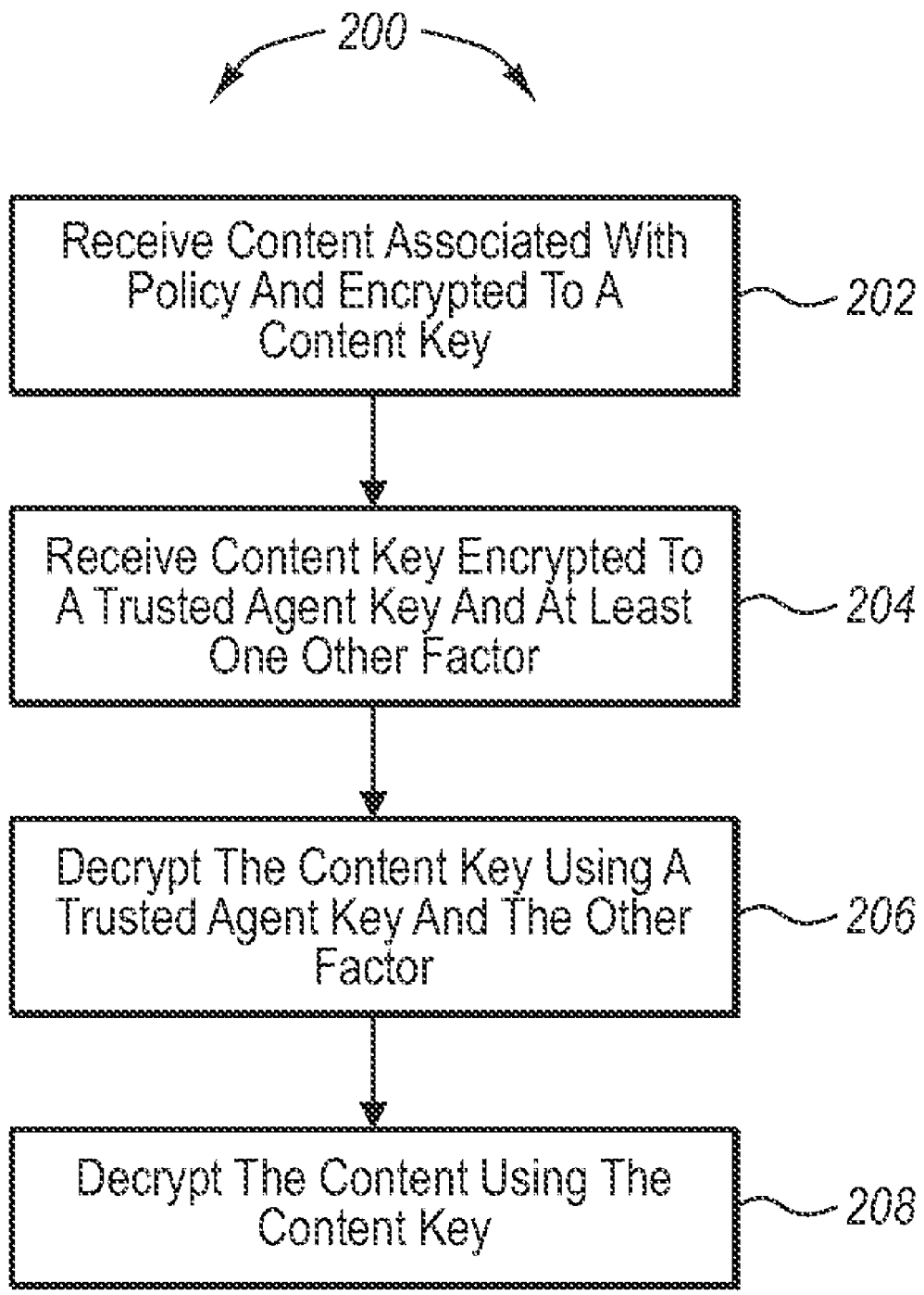
FIG. 2 illustrates a method of accessing protected content.

Referring now to FIG. 2, a method 200 is illustrated. The method 200 includes various acts for accessing protected content. The method 200 includes receiving content associated with policy and encrypted to a content key (act 202). This may be performed, for example, at the recipient 108 illustrated in FIG. 1A. In this example, access to at least some content used by the recipient 108 is managed by the access server 110. The access server 110 is configured to control the recipient's use of managed content through interaction with the trusted agent 112 tied to the recipient. As noted, the content 104 is encrypted to a content key 107. Further, the content is associated with policy information. The policy information includes the content key 107 for decrypting the content. The policy information may further include additional policy 106 related to how content should be used or accessed. The policy information, including the content key 107, is encrypted to an access server key 109 so that the policy information can be decrypted by the access server 110.

The method 200 further includes receiving the content key encrypted to a trusted agent key and at least one other factor (act 204). For example, at the recipient 108, the recipient 108 may receive from the access server 110, the content key 107. In this example, the content key 107 is encrypted to a trusted agent key 113 such that the trusted agent 112 can decrypt the content key 107. The content key is further encrypted to at least one additional factor, e.g. to factor key 116, defining additional content protection beyond content protection provided by trusted agent. If multiple factors are required, the process described above can be repeated for each factor or as each factor is required for each specific piece of content requiring that explicit factor.

The method 200 further includes decrypting the content key using the trusted agent key and the other factor (act 206). For example, at the recipient 108, decrypting the content key 107 using the trusted agent key 113 and the factor key 116 may be performed. The method 200 further includes decrypting the content using the content key (act 208).

The method 200 may further be performed where the at least one other factor is specified in the policy information. For example, the policy 106 sent from the publisher 102 may include information specifying one or more factors. In one embodiment, the at least one factor is specified generically as a class of factors. For example, a generic specification may specify that any smart card factor is sufficient. In other embodiments, the at least one factor is explicitly specified. For example, policy information may specify that a type of encryption, or encryption signed by a particular authority should be used. In yet another embodiment, the at least one factor is implicitly determined by a classification of at least a portion of the content. For example, certain types of content may require a certain type of factor, or a specific factor. Illustratively, high business impact content may require a smart card, while low business impact may only require a password.

To accomplish the specification of factors, in one embodiment, administrators can specify what protection factors are deployed and available in their organizations. These factors can be mapped back to certificate profiles that specify the type of protection (such as smartcards, biometrics, etc.) or back to a directory or repository that contain the public key information for each protection factor belonging to each user. An access server can map protection factor requirements from information protection policy to certificate profiles that describe specific factors and/or retrieve specific factor certificates from the directory. With this configuration information set, administrators can define information protection policy profiles that may require only single-factor protection or that may require multi-factor protection. These policy profiles can also specify which specific protection factors are required and what level of access is provided for each protection factor. They could also specify sections of content that are to be protected using multi-factor protection and other sections that are to be protected using single-factor protection. One common example might be for low business impact content to be unprotected, medium business impact content to be protected to a single factor (standard credentials), and high business impact content to be protected to multiple factors.

Depending on the overall information protection policy for the organization, content publishers may choose from a predefined policy template when protecting content, they may define their own information protection policies, or content may be automatically protected with some applicable policy by the information protection system.

Encrypting the content key to the at least one or more factors may be accomplished in a number of different ways. For example, in one embodiment, the content key is encrypted to at least one factor by encrypting the content key to one or more keys corresponding to one or more factors. In another alternative embodiment, the content is encrypted to at least one factor by encrypting the content to a single key derived from multiple factors. For example, rather than encrypting the content key to multiple protection factor keys (including the organization-managed key), the content key or the content itself can be protected using a unique key that is derived from the combination of all the protection factor keys involved. One mechanism for creating this derived content key would be to generate a random string per protection factor and then use each string as an input to a key derivation function such as PBKDF2 (Password-Based Key Derivation Function). The resulting derived content key is used to encrypt the content and then destroyed. Each random string is encrypted by the protection factor for which it was generated and the result is stored in the authorization token. Content decryption would then require each token to decrypt its random string so that the results could be input into the key derivation function, ultimately resulting in the derived content key that can decrypt the content.

In one embodiment, the policy information may specify use restrictions for the content. For example, the method 200 may be performed such that receiving from the access server, the content key, comprises receiving an authorization token specifying usage restrictions on the content. The usage restrictions are enforced by a trusted agent, such as the trusted agent 112 and/or a trusted application such as trusted application 117.

Further, use restrictions may be enforced depending on the additional factor(s). For example, the method 200 may further include an application at the recipient using the decrypted content. The application's use of the content is limited based on the factor or factors used to decrypt the content. In an alternative embodiment, a user's use of the content is limited based on the factor or factors used to decrypt the content. In yet another alternative embodiment, the content key is only enabled to decrypt a specified portion or portions of the content as defined by policy based on the available additional factor factors.

The following further illustrates additional examples where variable access levels are permitted based on available factors. For example, a consumer may be granted a different level of access to content based on the factors available at the time the content is accessed. Two examples will now be examined: when the portions of a content may be accessible using standard credentials while other portions of the content may only be accessible when a secondary factor of a specific type (such as a smartcard) is available; and when the content is read-only using only standard credentials and read/write when a secondary factor of a specific type (such as a smartcard) is available. Multi-factor protection can enforce these policies cryptographically.

For the first case, in which general access to protected content is based on standard credentials while certain sections are restricted to a secondary factor, each section can be encrypted using a different content key, with each content key encrypted with the appropriate additional factors. As an optimization, all sections that are covered by a common policy may be encrypted with the same content key, resulting in one content key per policy for the content rather than one content key per section of the content.

For the second case, in which read-only access is based on standard credentials while write access is restricted to a secondary factor, the content can be encrypted using an asymmetric key. When the content is created, it is encrypted using one half of the asymmetric content key pair (usually known as the public key). An authorization token would contain the decryption key, protected to the user's standard organization-managed key. This would allow the user to access the content using just standard credentials. The authorization token would also contain the encryption key, protected to a second factor such as a smartcard. In this way, the content cannot be modified unless the second factor is present to grant access to the encryption key. The net effect is similar to signing the content with a second factor, but unlike a signature, the validator does not need to trust the certificate of the signer.

Embodiments may have additional functionality in some information protection systems. For example, it may be desirable in some systems to implement embodiments where a publisher is not required to know the multiple protection factor keys of all recipients to publish content that is protected with multiple factors. Additionally, it may be desirable to support an offline scenario so that a recipient who has the necessary key material and protection factors should be able to access protected content even when the access server is unavailable.

To accomplish a system where the publisher is not required to know the multiple protection factor keys of all recipients, the access server, in conjunction with a directory, can provide a level of indirection. In one embodiment, the publisher only needs to know the access server's public key to protect information. Then, when an authorization token is generated, the access server can either request the appropriate certificates from the recipient or it can retrieve them from a directory. To accomplish a system where offline scenarios are supported, authorization tokens can be pre-fetched or cached on client machines.

Some embodiments of a system should allow for the keys behind a specific protection factor for a specific user to be rolled or changed. Depending on the nature of why the keys rolled, the action taken by the system may vary. For example, a revocation check could happen before content is decrypted so that a revoked protection factor cannot be used for content decryption. Such a revocation would invalidate any authorization tokens that are bound to that protection factor key. The user would get new keys through the organization's established process for key rolls, and then the user would retrieve new authorization tokens for all content that was protected using that factor, so that the new factor keys can be used for accessing the content.

Alternatively, if keys are rolled or changed preemptively to maintain key hygiene, and if the protection factor can support multiple "previous" key pairs in addition to the "current" key pair, then access to content can continue to be allowed without requiring new authorization tokens. The system could be configured to opportunistically acquire new authorization tokens encrypted to the new protection factor keys whenever possible, but the user experience could remain unaffected in the process.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing a method of protecting sensitive content by controlling how the sensitive content is used and accessed at a recipient computing system which is part of a computing network of a central organization, the computer program product comprising a computer storage device at the recipient computing system which contains computer-executable instructions to implement at the recipient computing system the method, and wherein the method is comprised of:
    at the recipient computing system which includes a trusted agent, running a trusted application that requires use of sensitive content stored within the central organization, and wherein
        access and use of the sensitive content is controlled by a policy associated with the content, the policy defining access and use restrictions,
        the sensitive content is encrypted to a content key,
        and access and use of the sensitive content requires decryption of the associated policy and the content key and then using the sensitive content only in accordance with its associated policy;
    at the recipient computing system, receiving from an access server of the central organization at least a portion of said policy and said content key, both of which are encrypted to (1) a trusted agent key maintained at said trusted agent, and (2) at least one other protection factor stored at the recipient computing system;
    at the recipient computing system, decrypting the received portion of the policy and the content key using the trusted agent key and the at least one other protection factor;
    at the recipient computing system, decrypting the content using the decrypted content key; and
    at the recipient computing system, the trusted application then using the decrypted sensitive content subject to the access and use restrictions contained in said portion of said policy received from the access server of the central organization.

2. The computer program product of claim 1, wherein the at least one factor is specified in the policy information.

3. The computer program product of claim 2, wherein the at least one factor is specified generically as a class of factors.

4. The computer program product of claim 2, wherein the at least one factor is explicitly specified by a particular class of factors.

5. The computer program product of claim 2, wherein the at least one factor is implicitly determined by a classification of at least a portion of the content.

6. The computer program product of claim 1, wherein the content key is encrypted to the at least one factor by encrypting the content key to one or more keys corresponding to one or more factors.

7. The computer program product of claim 1, wherein the content key is encrypted to the at least one factor by encrypting the content key to a single key derived from multiple factors.

8. The computer program product of claim 1, wherein decrypting the content using the content key and the at least one factor comprises the trusted agent using the trusted agent key to decrypt a user key, and using the user key to decrypt the content key.

9. The computer program product of claim 1, wherein receiving from the access server said portion of the policy and the content key comprises receiving an authorization token specifying usage restrictions on the content, and wherein the usage restrictions are enforced by the trusted agent.

10. The computer program product of claim 1, wherein a user's use of the content is limited based on the at least one factor used to decrypt the content.

11. The computer program product of claim 1, wherein the content key is only enabled to decrypt a specified portion or portions of the content as defined by policy based on the at least one factor.

12. The computer program product of claim 1, wherein prior to receiving said portion of the policy and said content key from the access server, the access server sends the portion of said policy said content key to at least one intermediary through which the portion of the policy and content key are then sent to the recipient computing system.

13. The computer program product of claim 1, wherein the access server sends the portion of said policy and said content key to at least one intermediary through which the portion of the policy and content key are then sent to the recipient computing system.

14. A computer program product for implementing a method of protecting sensitive content by controlling how the sensitive content is used and accessed at a recipient computing system which is part of a computing network of a central organization, the computer program product comprising a computer storage device at an access server of the central organization which contains computer-executable instructions to implement at the access server the method, and wherein the method is comprised of:
    at the access server, receiving the sensitive content, and wherein
        access and use of the sensitive content at the is controlled by a policy associated with the content, the policy defining access and use restrictions,
        the sensitive content is encrypted to a content key,
        access and use of the sensitive content requires decryption of the associated policy and the content key and then using the sensitive content only in accordance with its associated policy, and
        the associated policy and content key are encrypted to an access server key maintained at the access server;
    at the access server, decrypting the associated policy and content key using the access server key;
    at the access server, preparing a version of the associated policy for the recipient computing system; and
    sending from the access server to the recipient computing system the version of the associated policy prepared for the recipient computing system, and the content key, both of which are encrypted to (1) a trusted agent key maintained at a trusted agent of the recipient computing system, and (2) at least one other protection factor stored at the recipient computing system, so that thereafter the recipient computing system is able to decrypt said version of the policy and the content key using the trusted agent key and the at least one other protection factor, and so that the recipient computing system is then able to decrypt the content using the decrypted content key so that the decrypted content can be used in accordance with the access and use restrictions defined by said version of the policy at a trusted application running at the recipient computing system.

15. The computer program product of claim 14, wherein the at least one factor is specified in the policy information.

16. The computer program product of claim 15, wherein the at least one factor is specified generically as a class of factors.

17. The computer program product of claim 15, wherein the at least one factor is explicitly specified by a particular class of factors.

18. The computer program product of claim 15, wherein the at least one factor is implicitly determined by a classification of at least a portion of the content.

19. The computer program product of claim 14, wherein the content key is encrypted to the at least one factor by encrypting the content key to one or more keys corresponding to one or more factors.

20. The computer program product of claim 14, wherein the content key is encrypted to the at least one factor by encrypting the content key to a single key derived from multiple factors.

21. The computer program product of claim 14, wherein sending from the access server said portion of the policy and the content key comprises sending an authorization token specifying usage restrictions on the content, and wherein the usage restrictions are capable of being enforced by the trusted agent.

22. The computer program product of claim 14, wherein a user's use of the content is limited based on the at least one factor used to decrypt the content.

23. The computer program product of claim 14, wherein the content key is only enabled to decrypt a specified portion or portions of the content as defined by policy based on the at least one factor.

* * * * *